March 5, 1957  F. W. SIMPKIN ET AL  2,783,611
TOOL FOR ASSEMBLING SIDE PLATES AND HEADING
RIVETS IN ROLLER OR BUSH CHAINS
Filed May 14, 1954  2 Sheets-Sheet 1
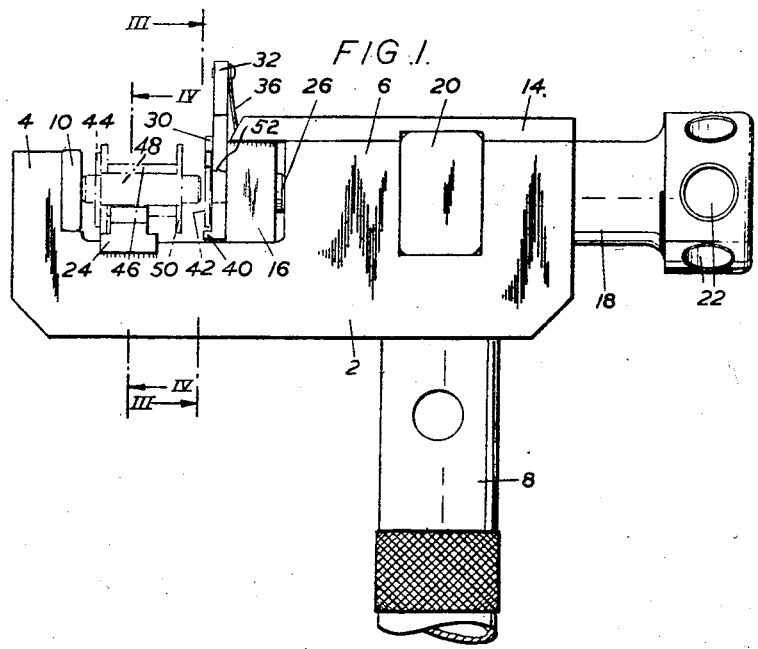
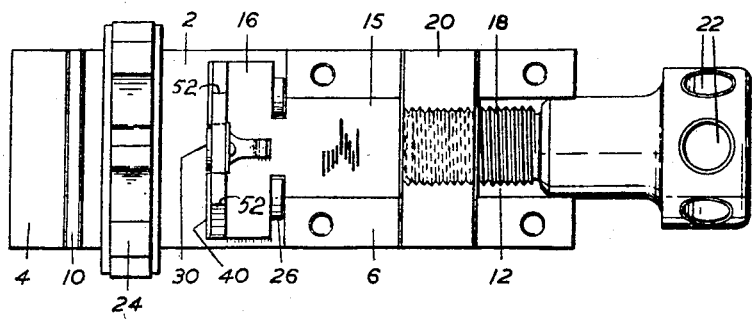
INVENTORS
Francis W. Simpkins
Onissim Burawoy
By Watson, Cole Grindle &
Watson
ATTORNEYS March 5, 1957 F. W. SIMPKIN ET AL 2,783,611
TOOL FOR ASSEMBLING SIDE PLATES AND HEADING
RIVETS IN ROLLER OR BUSH CHAINS
Filed May 14, 1954 2 Sheets-Sheet 2
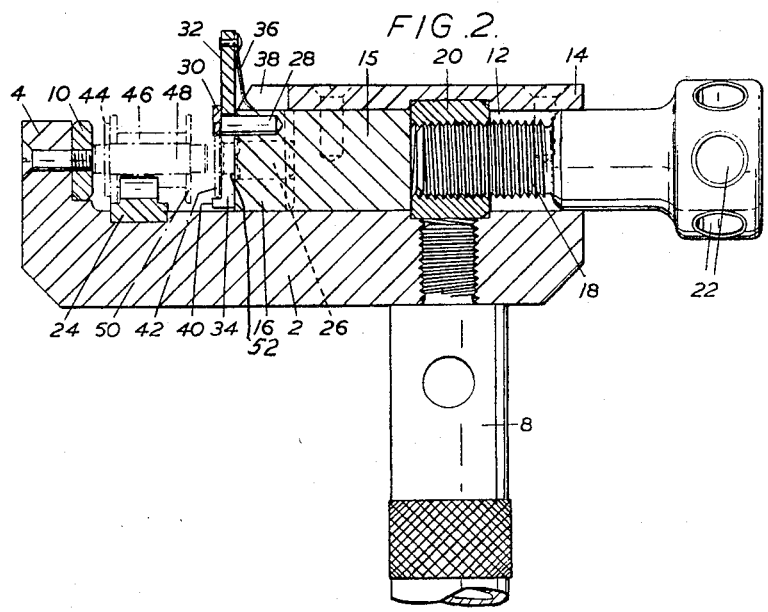
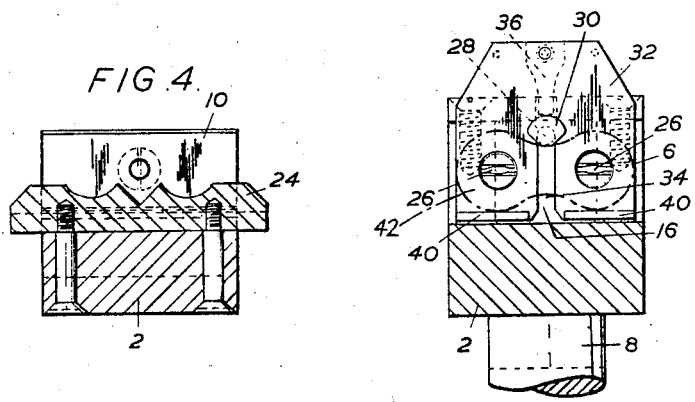

United States Patent Office 2,783,611
Patented Mar. 5, 1957

2,783,611

TOOL FOR ASSEMBLING SIDE PLATES AND HEADING RIVETS IN ROLLER OR BUSH CHAINS

Francis Walter Simpkin and Onissim Burawoy, Didsbury, Manchester, England, assignors to Renold Chains Limited, a British company Application May 14, 1954, Serial No. 429,864

Claims priority, application Great Britain May 19, 1953

13 Claims. (Cl. 59—7)

When a roller or bush chain has been cut to length for a particular drive it is necessary to join two ends together. Often this has to be done with the chain in position on its chain wheels, often in confined spaces. If the chain has to operate in conditions of heavy loading and/or high speeds, for example in the drive of a motor cycle, the use of a detachable joining link, in which one of the outer plates is held in place by a spring clip or split pins, is not favoured as such a link is weaker than the rest of the chain. Accordingly the joining link has to be made in the same manner as the rest of the chain; that is to say the outer plates at both sides have to be interference fits on the pins and the ends of the pins are riveted over after the plates are in position. A considerable problem arises in providing means, which can be operated by hand in a confined space, for forcing the second plate of the joining link into place with the link in position, and riveting the ends of the pins over that plate.

According to the present invention a hand tool for carrying out both these operations comprises a cradle for the bushes or rollers of the adjoining inner links through which the pins of the joining link pass, an anvil for the other ends of the pins, which other ends are already riveted before the tool is used, a jaw movable by a screw towards the anvil and having punches in its face for riveting the first-mentioned ends of the pins, and a detachable carrier for the second plate of the joining link which carrier can be fitted over the face of the jaw so that the second plate can be forced by the jaw on to the pins, and which carrier can thereafter be slid from between the jaw and the second plate so that the ends of the pins can be riveted by the punches.

Preferably a lip projects from the carrier for supporting the lower edge of the second plate, a peg projects from the jaw through an open-ended slot in the carrier, and the peg is positioned to engage the centre of the upper edge of the second plate, whereby the second plate may be received between the lip and the peg and be thereby aligned and supported for the second plate to be pressed on to the pins, and whereby during the riveting of the pin ends the peg serves to align and hold the connecting link on the cradle.

A preferred form of tool according to the invention will now be described in more detail with reference to the accompanying drawings in which:

Figure 1 is a side elevation of the tool;
Figure 2 is a central vertical section;
Figures 3 and 4 are sections on the lines III—III and IV—IV of Figure 1; and
Figure 5 is a plan with a cover removed.

In the following description the tool is considered with its base downwards, but it can of course be held in any desired attitude.

The tool has a flat base 2 with an upstanding lug 4 at one end and an upstanding block 6 at the other end. A detachable handle 8 projects downwards from the base beneath the block. An anvil 10 is fitted to the inner face of the lug 4. The block has a longitudinal slot 12 closed by a cover 14 so as to form a bore, which is rectangular in cross section and acts as a guide for the stem 15 of a jaw 16 which can slide towards and away from the anvil 10. The jaw 16 is controlled by a screw 18 which lies in the bore and which engages a stationary nut 20 located in a transverse slot in the block. The outer end of the screw projects beyond the outer end of the block and has transverse holes 22 to receive a tommy bar. A cradle 24 for the rollers or bushes of the chain is secured to the base between the lug 4 and the block 6.

The exposed face of the jaw 16 is flat, with two inserted hardened punches 26 which engage the ends of the pins in the riveting operation. In addition a peg 28 is inserted into the face of the jaw. This peg has a head 30 the lower part of which is cut away into line with the shank of the peg.

The tool comprises in addition a detachable carrier 32. This is a flat plate which fits in a vertical plane against the face of the jaw. There is a slot 34 extending upwards from the lower edge of the plate to fit over the shank of the peg 28. A leaf spring 36 with a curled-up lower end is secured to the upper part of the back of the carrier. When the carrier is in position, the curled-up end of this spring passes through a notch 38 in the cover on the block, and bears on the top of the jaw. The lower edge of the carrier has a small lip 40 directed towards the anvil. The carrier 32 is formed with two holes 52 into which the ends of the pins of the joining link enter when the second plate thereof is being pressed into position as hereinafter described.

In use the jaw 16 is initially moved away from the anvil 10. The carrier 32 is slid into position between the face of the jaw and the head of the peg 28, and the second plate 42 of the joining link is fitted against the exposed face of the carrier, between the peg and the lip on the carrier (as shown in Figures 1, 2 and 3). The carrier has to be slightly depressed against the spring 36 to receive the second plate which is thereafter frictionally held in place. The cut-away part of the head of the peg 28 co-operates with the upper edge of the waist in the plate to locate the plate transversely in the tool. The remainder of the joining link is placed in position with the first plate 44 towards the anvil and with the rollers or bushes 46 which surround the pins 48 resting in the cradle 24. The screw 18 is then turned to force the second plate over the exposed ends of the pins. If the pins are shouldered then the screw is turned until the plate is felt to engage the shoulders. If not, the screw is turned until the plate is against the inner plates 50 of adjoining links, the inner faces of which can be positioned by the portion of the cradle contacting the rollers or bushes so that freedom of articulation of inner link and joining link is retained. At this stage the ends of the pins enter holes 52 in the carrier but do not reach the punches 26.

Then the screw 18 is slightly reversed to enable the lip 40 on the carrier to be moved clear of the second plate and the holes in the carrier clear of the pins, and the carrier is withdrawn upwards. Finally the screw 18 is turned to bring the punches in the jaw against the ends of the pins and sufficient force is applied to rivet these ends over. During this operation the peg 28 slides over the top of the second plate and by holding the links in position on the cradle ensures proper alignment of the ends of the pins with the punches. The screw 18 is then reversed to release the chain.

Hitherto the operations of forcing the second plate onto the pins and riveting over the ends of the pins have either been carried out by separate tools or by means of a tool with a jaw with recessed punches which carries out both operations in one movement. Thus latter procedure is unsatisfactory since the position reached by the second plate is determined by the length of the pins, which in practice is not uniform. In using a tool according to the present invention the length of the pins does not affect the position reached by the second plate. The procedure with two tools is also unaffected by the length of the pins, but is slower and the two tools are more expensive. Moreover hitherto the link has not been precisely located in the manner attained by the use of a peg projecting from the jaw.

We claim:

1. A hand tool, for fitting the second plate and riveting the ends of the pins of a joining link in a roller or bush chain, comprising in combination a cradle for the bushes or rollers of the adjoining inner links through which the pins of the joining link pass, an anvil for the other ends of the pins, which other ends are already riveted, a jaw, means guiding the jaw for movement toward and away from the anvil, screw means for effecting such movement of the jaw, punches in the face of the jaw directed towards the anvil for riveting the first-mentioned ends of the pins, and a second-plate carrier removably carried by the jaw, clearance apertures formed in said second-plate carrier, said carrier serving to support the second plate so that it may be pressed over the pin ends by operation of the screw so that the said pin ends project through said second plate into said clearance apertures, whereby after removal of the carrier from the said face of the jaw the said first-mentioned ends of the pins may be riveted by operation of the screw.

2. A hand tool according to claim 1, including a lip projecting from the carrier to support the lower edge of the second plate, and a peg projecting from the said face of the jaw, the carrier being formed with an open-ended slot through which said peg projects, and the peg being positioned to engage the centre of the upper edge of the second plate, whereby the second plate may be received between the lip and the peg and be thereby aligned and supported for the second plate to be pressed on to the pins as aforesaid, and whereby during the riveting of the pin ends as aforesaid the peg serves to align and hold the assembled connecting link on the cradle.

3. A hand-operated tool for fitting and securing the second plate of the joining link of a roller or bush chain having an incomplete joining link comprising two pins and a first plate over which one end of each pin is riveted, which tool comprises in combination a body member, a cradle carried on the upper face of said body member for supporting the bushes or rollers of adjoining inner links through which the pins of the joining link pass, an anvil carried by the body member to abut against the said riveted ends of the pins, a jaw guided on the body member for movement towards and away from the anvil and having a face directed towards the anvil, a screw means operative between the jaw and the body member for effecting such movement of the jaw, punches in the said face of the jaw for riveting the other ends of the pins, and a second-plate carrier removably carried by the jaw and superposed on the said face thereof, the carrier serving to support the second plate so that it may be pressed over the said other ends of the pin by operation of the screw, the carrier being formed with clearance apertures to receive the said other ends of the pin, and the thickness of the carrier being greater than the normal maximum length of the parts of the pins which project outwardly beyond the second plate when it has been correctly positioned on the pins, whereby the carrier prevents indentation of the pin ends by the punches until after the carrier has been removed from the jaw.

4. A tool according to claim 3, wherein the carrier has an outstanding lip for supporting the lower edge of the second plate, a peg projects from the said face of the jaw, the carrier is formed with a slot which is open at its lower end, through which slot the peg projects, the peg is positioned so as to engage with the centre of the upper edge of the second plate, spring means urge the carrier upwardly, whereby the second plate is gripped between said lip and said peg and is thereby held and aligned in relation to the cradle, and the peg has a head serving to retain the carrier against the said face of the jaw, the said open-ended slot permitting the carrier to be slid upwardly away from the jaw.

5. A tool according to claim 4, wherein the lower side of the peg is shaped to mate with the concave central part of the upper edge of a second plate.

6. A hand operated chain tool, for fitting the second plate of a joining link in a roller or bush chain and for riveting the ends of the pins of the joining link which project through the second plate, comprising in combination, a body member, a cradle carried on the upper face of said body member for supporting the bushes or rollers of adjoining inner links through which the pins of the joining link pass, an anvil carried by the body member to abut against the riveted ends of the pins, a jaw guided on the body member for movement towards and away from the anvil and having a face directed towards the anvil, screw means operative between the jaw and the body member for effecting such movement of the jaw, recessed punching projections in said face for riveting said projecting ends of the pins, a second-plate carrier formed separately from said movable jaw, and means for releasably securing said carrier to said face of said jaw, the carrier serving to support the second plate so that it may be pressed over the projecting ends of the pins by operation of the screw means, the carrier being formed with clearance apertures to receive the projecting ends of the pins, and the thickness of the carrier together with the depth of the punching projections below the surface of the said face of the jaw being greater than the normal maximum length of the parts of the pins which project outwardly beyond the second plate when it has been correctly positioned on the pins, whereby the thickness of the carrier and the said depth of the punching projections prevent indentation of the pin ends by the projections until after the carrier has been removed.

7. A hand operated chain tool, for fitting the second plate of a joining link in a roller or bush chain and for riveting the ends of the pins of the joining link which project through the second plate, comprising in combination, a base member, an abutment head upstanding from the base member at or near one end thereof, a guide block upstanding from the base member at or near the other end thereof and formed with a guideway extending into or through it, said abutment head and said buide block being spaced apart so as to form a chain-receiving recess therebetween, a cradle for the bushes or rollers of the adjoining inner links through which the pins of the joining link pass, said cradle being positioned in said chain-receiving recess so that the riveted ends of the pins of the joining link abut against the abutment head, a movable jaw guided for rectilinear movement towards and away from said abutment head by said guideway in said guide block, screw means for effecting such movement of the movable jaw, punches in the face of the jaw directed towards the abutment head for riveting the ends of the pins, a second-plate carrier formed separately from said movable jaw, clearance apertures formed in said second-plate carrier, and means for releasably securing said carrier to said movable jaw, whereby the second-plate may be positioned in the second plate carrier and the jaw may be moved towards the abutment head so that the second plate is pressed over the pin ends so that the said ends project through the second plate into said clearance apertures, and the jaw may be moved away from the abutment head so as to permit the second-plate carrier to be removed therefrom, the second plate being retained on said pins, and whereby after the removal of the carrier from the said movable jaw, the jaw may be again moved towards the abutment head until the punches abut the ends of the pins projecting through the second plate whereby on further movement of the jaw towards the abutment head the said projecting ends of the pins are riveted so as to secure the second plate on the said joining link, the punches being positioned on the said face of the jaw so that the ends of the pins cannot be riveted until the second plate carrier is removed from the jaw.

8. A hand operated chain tool as claimed in claim 7, wherein the carrier is provided with a projecting lip to support the lower edge of the second plate, and the jaw is provided with a peg projecting towards the abutment head, the carrier being formed with an open-ended slot through which said peg projects, and the peg being positioned to engage the centre of the upper edge of the second plate, whereby the second plate may be received between the lip and the peg and be thereby aligned and supported for the second plate to be pressed over the ends of the pins as aforesaid, and whereby during the subsequent riveting as aforesaid the peg serves to align and hold the assembled connecting link on the cradle.

9. A hand operated chain tool, for fitting the second plate of a joining link in a roller or bush chain and for riveting the ends of the pins of the joining link which project through the second plate, comprising in combination, a base member, an abutment head upstanding from the base member at or near one end thereof, a guide block upstanding from the base member at or near the other end thereof and formed with a guideway extending into or through said guide block, said abutment head and said guide block being spaced apart so as to form a chain-receiving recess therebetween, a cradle for the bushes or rollers of the adjoining inner links through which the pins of the joining link pass, said cradle being positioned in said chain-receiving recess so that the riveted ends of the pins of the joining link abut against the abutment head, a movable jaw guided for rectilinear movement towards and away from said abutment head by said guideway in said guide block, screw means for effecting such movement of the movable jaw, punches provided in the face of the jaw directed towards said abutment head, a second-plate carrier formed separately from said movable jaw, and means for releasably securing said carrier to said movable jaw, the carrier serving to support the second plate of the joining link so that the jaw may be moved towards the abutment head by operation of the screw until the second plate is pressed over the pin ends so that the said ends project into clearance apertures formed in said second-plate carrier, the carrier being of such thickness that the normal maximum length of the projecting portions of the pins is less than the said thickness, whereby the carrier prevents riveting of the pins by the jaw until the carrier has been removed from the jaw and the jaw may be moved away from the abutment head so as to permit the second-plate carrier to be removed therefrom, the second plate being retained on said pins, and whereby after the removal of the carrier from the said movable jaw as aforesaid the jaw is again moved towards the abutment head until the punches abut the ends of the pins projecting through the said second plate whereby on further movement of the jaw towards the abutment head the said ends of the pins are riveted by the punches so as to secure the second plate on the said joining link.

10. A hand operated tool according to claim 9, wherein punches are provided in the face of the jaw directed towards the abutment head for riveting the ends of the pins after the second plate carrier has been removed.

11. A hand operated chain tool, for fitting the second plate of a joining link in a roller or bush chain and for riveting the ends of the pins of the joining link which project through the second plate, comprising in combination, a support member, an abutment head upstanding from the support member at or near one end thereof, an anvil rigidly secured to said abutment head, a guide block upstanding from the support member at or near the other end thereof and formed with a guideway extending into or through said guide block, a cradle for the bushes or rollers of the adjoining inner links through which the pins of the joining link pass, said anvil and said cradle being positioned so that when the adjoining inner links are positioned in the cradle the riveted ends of the pins of the joining link abut against the anvil, a jaw guided on the base member for rectilinear movement towards and away from said anvil by said guideway in said guide block, screw means for effecting such movement of the movable jaw, punches in the face of the jaw directed towards the anvil for riveting the projecting ends of the pins, a second-plate carrier formed separately from the said movable jaw, clearance apertures formed in said second-plate carrier, and means for releasably securing said carrier to said movable jaw, whereby the second-plate may be positioned in the second plate carrier and the jaw may be moved towards the abutment head so that the second plate is pressed over the pin ends so that the said pin ends project into the second plate to lie in said clearance apertures, and the jaw may be moved away from the abutment head so as to permit the second-plate carrier to be removed therefrom, the second plate being retained on said pins, and whereby after the removal of the carrier from the said movable jaw as aforesaid the ends of the pins may be riveted by moving the jaw towards said abutment head, the punches being positioned in the face of the jaw so that the projecting ends of the pins cannot abut against the punches until the second-plate carrier has been removed as aforesaid.

12. A hand operated chain tool, for fitting the second plate of a joining link in a roller or bush chain and for riveting the ends of the pins of the joining link which project through the second plate, comprising in combination, a substantially rectangular shaped base member, an anvil upstanding from the base member at or near one end thereof, said anvil including a substantially vertical face directed towards the other end of the base member, a guide block upstanding from the base member at or near the other end thereof, said anvil and said guide block being spaced apart so as to form a chain-receiving recess therebetween, a cradle for the bushes or rollers of the adjoining inner links through which the pins of the joining link pass, said cradle being positioned in said chain-receiving recess so that when the adjoining inner links are positioned in the cradle, the riveted ends of the pins of the joining link abut against the said vertical face of the anvil, a jaw guided on said base member for rectilinear movement towards and away from said abutment head, said jaw including a substantially vertical face directed towards the said one end of the base member, punches provided in the said vertical face, screw means for effecting such movement of the movable jaw, a second-plate carrier formed separately from said movable jaw, clearance apertures formed in said second-plate carrier, said carrier including a lip adjacent one edge thereof to support the lower edge of the second plate when carried thereby, a peg projecting outwardly from said movable jaw toward said anvil and adapted to engage with an open ended slot formed in said carrier so that movement of the carrier towards and away from the anvil relative to the jaw is positively prevented, spring means urging said carrier away from the base member, whereby the second plate may be positioned in the second plate carrier so that the lower edge thereof is supported by the upper edge of the lip as aforesaid and the upper edge thereof abuts against the lower surface of the pin, the spring means urging the lip towards the peg and thereby causing the second plate to be gripped between the lip and the peg in aligned relationship to the cradle, whereby the second-plate may be positioned in the second plate carrier as aforesaid and the jaw may be moved towards the abutment head so that the second plate is pressed over the pin ends so that the ends project through the second plate, and the jaw may be moved away from the abutment head so as to permit the second-plate carrier to be removed therefrom, the second plate being retained on said pins and whereby after the removal of the carrier from the said movable jaw as aforesaid the ends of the pins may be riveted by moving the jaw towards said abutment head.

13. A hand operated chain tool as claimed in claim 12, wherein the lower side of the peg is shaped to mate with the concave central part of the upper edge of the second plate.

References Cited in the file of this patent

UNITED STATES PATENTS

| | | |
|---|---|---|
| 95,663 | Dean | Oct. 12, 1869 |
| 1,436,429 | Bean | Nov. 21, 1922 |
| 1,469,594 | Harley | Oct. 2, 1923 |
| 2,361,971 | Shipman | Nov. 7, 1944 |
| 2,700,870 | Green | Feb. 1, 1955 |

FOREIGN PATENTS

| | | |
|---|---|---|
| 331,093 | Great Britain | June 26, 1930 |
| 148,715 | Great Britain | Aug. 5, 1920 |